United States Patent
Arngren et al.

(10) Patent No.: US 12,309,681 B2
(45) Date of Patent: May 20, 2025

(54) SELECTING A NEXT HOP FOR A DATA PACKET

(71) Applicant: Telefonaktiebolaget LM Ericsson (publ), Stockholm (SE)

(72) Inventors: Tommy Arngren, Södra Sunderbyn (SE); Min Wang, Luleå (SE); Jan Christoffersson, Luleå (SE); Mårten Ericson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 601 days.

(21) Appl. No.: 17/425,997

(22) PCT Filed: Feb. 6, 2019

(86) PCT No.: PCT/EP2019/052914
§ 371 (c)(1),
(2) Date: Jul. 27, 2021

(87) PCT Pub. No.: WO2020/160767
PCT Pub. Date: Aug. 13, 2020

(65) Prior Publication Data
US 2022/0303864 A1    Sep. 22, 2022

(51) Int. Cl.
*H04W 40/12* (2009.01)
*H04W 40/02* (2009.01)
*H04W 40/20* (2009.01)

(52) U.S. Cl.
CPC ......... *H04W 40/12* (2013.01); *H04W 40/026* (2013.01); *H04W 40/20* (2013.01)

(58) Field of Classification Search
CPC ... H04W 40/12; H04W 40/026; H04W 40/20; H04W 72/10; H04W 40/16;
(Continued)

(56) References Cited

U.S. PATENT DOCUMENTS

| | | | |
|---|---|---|---|
| 9,036,509 B1 * | 5/2015 | Addepalli | H04L 69/18 701/1 |
| 10,271,261 B1 * | 4/2019 | Lindsley | H04W 40/14 |

(Continued)

FOREIGN PATENT DOCUMENTS

| | | | | |
|---|---|---|---|---|
| CN | 106028459 A | * | 10/2016 | H04W 72/10 |
| CN | 110149671 A | * | 8/2019 | H04L 1/0083 |

(Continued)

OTHER PUBLICATIONS

Lee, Spenser, "Routing UAVs to Co-Optimize Mission Effectiveness and Network Performance with Dynamic Programming" 2011 (Year: 2011).*

(Continued)

*Primary Examiner* — Ayaz R Sheikh
*Assistant Examiner* — Louis Samara
(74) *Attorney, Agent, or Firm* — Weisberg I.P. Law, P.A.

(57) ABSTRACT

Methods and apparatus are provided for selecting a next hop for a data packet. In one aspect, a method in a first node of selecting a next hop for a data packet includes determining a volume that is at least partially located between a first communication device and a destination node of the data packet, determining at least one moveable communication device located within the volume, and selecting one of the at least one moveable communication device as a next hop for the data packet after the first communication device.

18 Claims, 4 Drawing Sheets

(58) Field of Classification Search
CPC .. H04W 36/324; H04W 40/14; H04L 1/0083; H04L 45/24; H04L 12/1845; H04L 43/08; G01S 5/0226

See application file for complete search history.

(56) References Cited

U.S. PATENT DOCUMENTS

| | | | |
|---|---|---|---|
| 2010/0246492 A1* | 9/2010 | Scarlatti | H04L 45/123 370/328 |
| 2017/0093687 A1* | 3/2017 | Wu | H04L 45/12 |
| 2017/0104834 A1* | 4/2017 | Huang | H04L 5/0055 |
| 2017/0235316 A1* | 8/2017 | Shattil | H04W 4/40 701/3 |
| 2017/0285633 A1* | 10/2017 | Poornachandran | G08G 5/55 |
| 2018/0054701 A1* | 2/2018 | Klimek | G01S 5/0226 |
| 2018/0063295 A1* | 3/2018 | Belikovetsky | H04L 12/1845 |
| 2020/0389831 A1* | 12/2020 | Mackenzie | H04W 36/324 |
| 2023/0109635 A1* | 4/2023 | Palermo | H04W 40/16 455/13.1 |

FOREIGN PATENT DOCUMENTS

| | | | | |
|---|---|---|---|---|
| CN | 111132258 A | * | 5/2020 | H04W 40/04 |
| FR | 3042931 A1 | * | 4/2017 | H04B 7/18504 |
| JP | 2008118484 A | | 5/2008 | |
| WO | WO-2014058229 A1 | * | 4/2014 | H04W 40/12 |
| WO | WO-2018035508 A1 | * | 2/2018 | G01C 21/20 |
| WO | WO-2018220443 A1 | * | 12/2018 | H04L 45/124 |

OTHER PUBLICATIONS

Omar Sami Oubbati et al.; A survey on position-based routing protocols for Flying Ad hoc Networks (FANETs); Vehicular Communications, Oct. 2017, consisting of 28-pages. (Year: 2017).*

Zioayan Ma: Opportunistic Communication in WSN Using UAV, IEEE, 2017, 14th Annual Consumer & Networking Conference (Year: 2017).*

Rahman, Shams, "Positioning of UAVs for throughput maximization in software-defined disaster area UAV communication networks" Oct. 2018 (Year: 2018).*

Muhammad Yeasir Arafat: A Survey on Cluster-Based Routing Protocols for Unmanned Aerial Vehicle Networks, IEEE Access; Nov. 1, 2018 (Year: 2018).*

Qian Mao; Deep Learning for Intelligent Wireless Networks:; A Comprehensive Survey; IEEE Communications Surveys & Tutorials vol. 20, No. 4, Fourth Quarter 2018 (Year: 2018).*

Ejaz Ahmed; Cooperative Vehicular Networking: A Survey; IEEE trans Intell Transp Syst. Mar. 2018; NIST Manuscript (Year: 2018).*

Xianbin Cao; Airborne Communication Networks: A Survey; IEEE Journal on Select Areas in Communications; (Year: 2018).*

Jiajia Lu; Space-Air-Ground Integrated Network: A Survey; IEEE Communications Surveys; vol. 20, Issue 4, Fourth Quarter 2018 (Year: 2018).*

International Search Report and Written Opinion dated Sep. 25, 2019 for International Application No. PCT/EP2019/052914 filed Feb. 6, 2019, consisting of 11-pages.

The Future of Drones According to the AT&T Foundry; AT&T Foundry, Ericsson, RocketSpace, Jun. 10, 2016, Consisting of 4-pages.

Omar Sami Oubbati et al.; A survey on position-based routing protocols for Flying Ad hoc Networks (FANETs); Vehicular Communications, Oct. 2017, consisting of 28-pages.

Gokhan Secinti et al.; SDNs in the Sky: Robust End-to-End Connectivity for Aerial Vehicular Networks; IEEE Communications Magazine, vol. 56, No. 1, Jan. 2018, consisting of 6-pages.

"IP Routing" Wikipedia; Wikimedia Foundation, Inc.; Dec. 8, 2017, consisting of 3 pages.

* cited by examiner

US 12,309,681 B2

SELECTING A NEXT HOP FOR A DATA PACKET

CROSS-REFERENCE TO RELATED APPLICATION

This application is a Submission Under 35 U.S.C. § 371 for U.S. National Stage Patent Application of International Application Number: PCT/EP2019/052914, filed Feb. 6, 2019 entitled "SELECTING A NEXT HOP FOR A DATA PACKET," the entirety of which is incorporated herein by reference.

TECHNICAL FIELD

Examples of the present disclosure relate to selecting a next hop for a data packet.

BACKGROUND

Unmanned aerial vehicles (UAVs), which are often referred to as drones, are used in a wide variety of applications. Examples include delivery services, aerial photography, remote sensing tasks for agriculture, city planning, civil engineering and support for public services. UAVs may be remote controlled over a wireless connection, or may move autonomously.

SUMMARY

One aspect of the present disclosure provides a method in a first node of selecting a next hop for a data packet. The method comprises determining a volume that is at least partially located between a first communication device and a destination node of the data packet. The method also comprises determining at least one moveable communication device located within the volume, and selecting one of the at least one moveable communication device as a next hop for the data packet after the first communication device.

Another aspect of the present disclosure provides apparatus for selecting a next hop for a data packet. The apparatus comprises a processor and a memory. The memory contains instructions executable by the processor such that the apparatus is operable to determine a volume that is at least partially located between a first communication device and a destination node of the data packet, determine at least one moveable communication device located within the volume, and select one of the at least one moveable communication device as a next hop for the data packet after the first communication device.

A further aspect of the present disclosure provides apparatus for selecting a next hop for a data packet. The apparatus is configured to determine a volume that is at least partially located between a first communication device and a destination node of the data packet, determine at least one moveable communication device located within the volume, and select one of the at least one moveable communication device as a next hop for the data packet after the first communication device.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In an IP forwarding algorithm, each IP terminal (e.g. communication device or router) may maintain IP routing table in its memory. When receiving an IP packet, the terminal searches this table. If the received packet is from a network interface, the terminal first checks if the destination address is one of the host addresses at the terminal. If so, this IP packet is sent upwards to the transport layer for further processing. If not, the IP packet should be forwarded. Each entry of the IP routing table includes information including, for a destination IP address, the IP address for the next-hop router. The IP routing is performed hop by hop, meaning that each terminal or hop does not hold a complete path to the destination.

When no route is available (e.g. there is no entry in the routing table for the destination of the packet), an error message (e.g. an Internet Control Message Protocol, ICMP, message) may be sent to the originator of the packet, which may avoid retransmission of the packet by the originator and avoid network congestion.

Figure 1:
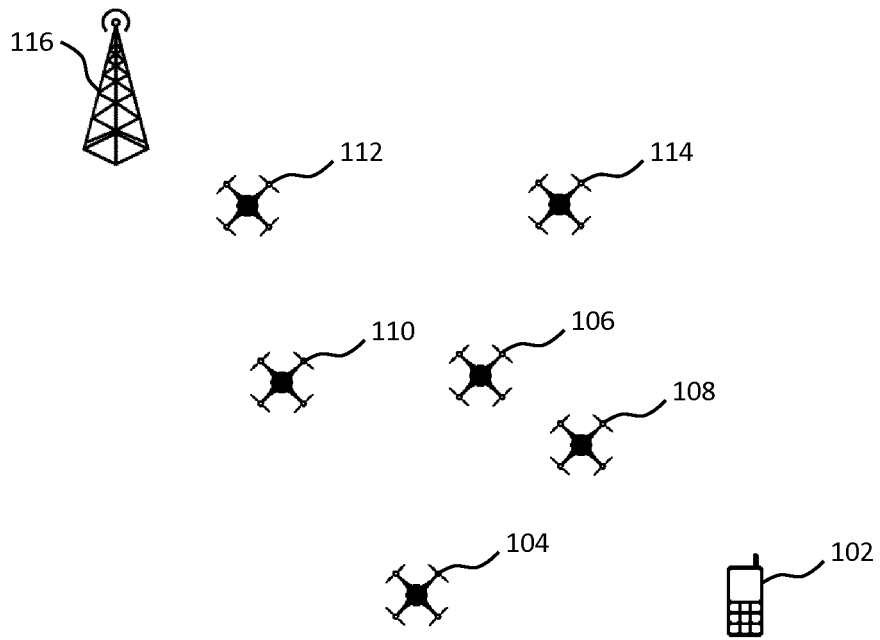
FIG. 1 is an example of a communication system.

Existing packet routing solutions may not determine optimal routing of packets in a network that uses moveable communication devices, such as for example UAVs. FIG. 1 is an example of a communication system 100. An originating device 102, which in this example is a mobile or cellular communications device but in other examples be any other type of communication device including a moveable communication device or router, may communicate with movable communication devices located within range of the originating device 102, in this case moveable communication devices 104, 106 and 108. In this example, the moveable communication devices are shown as UAVs, or are mounted on UAVs, though in other examples the devices may be other types, including ground-based moveable communication devices. The communication system 100 includes three further moveable communication devices, 110, 112 and 114, which are out of range of the originating device 102. The originating device wishes to transmit a data packet to a destination node 116 acting as an access network node, which in this example is a base station that is out of range of the originating device 102. The base station 116 is within range of moveable communication device 112. In this example, the destination may comprise a destination of the packet within the communication system 100, but this may not be the ultimate destination of the packet. Each moveable communication device may be moveable, for example autonomously, via remote control, or by a local operator. Each moveable communication device may also be stationary or may be moving, and thus has a velocity.

Embodiments disclosed herein may provide a mechanism for routing of data packets, for example from an originating device 102 to a destination node 116, via mobile communication devices 104-114. A next hop may in some examples be selected based on current node positions and availability, and also in some examples on predicted node positions (e.g. based on node velocity). Here, a "node" may be a moveable communication device. In some embodiments, a node (which may be the originating node of a data packet) may request the moveable communication device that is the next hop to change its velocity, for example to adapt to routing of data packets.

Figure 2:
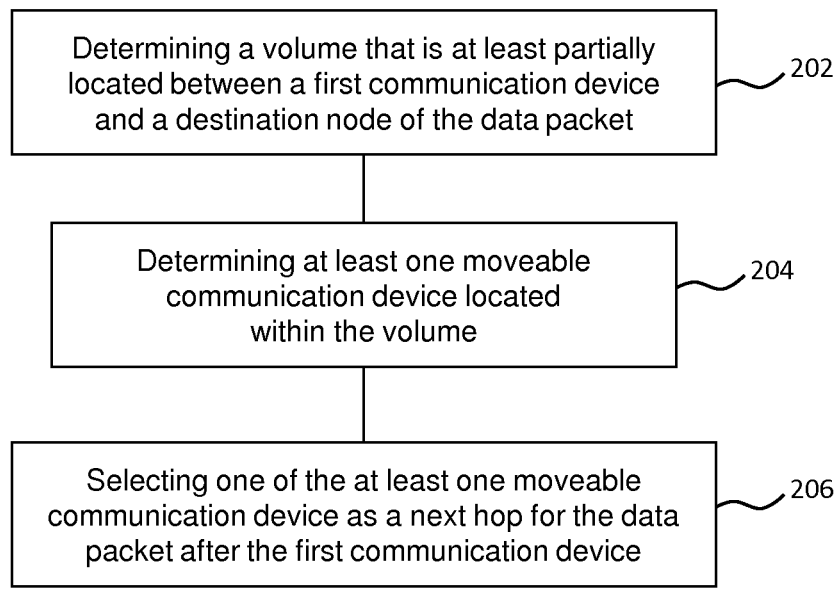
FIG. 2 is a flow chart of an example of a method of selecting a next hop for a data packet.

FIG. 2 is a flow chart of an example of a method in a first node of selecting a next hop for a data packet. The first node may be for example an originating node, such as for example the first communications device 102, or may be a moveable communications device, such as for example one of the moveable communication devices 104-114. Alternatively, the first node may be another network node. The method 200 comprises, in step 202, determining a volume that is at least partially located between a first communication device and a destination node of the data packet. The first communication device may comprise an originating node of the data packet. The first communication device may additionally or alternatively comprise a communication device such as a mobile communication device or user equipment (UE), or may comprise a moveable communication device such as a UAV. In some examples, each of the at least one moveable communication device comprises a device suitable for receiving and forwarding the data packet, such as for example a router (e.g. IP router).

The volume is located at least partially between the first communication device (e.g. the mobile device 102 shown in FIG. 1) and the destination node (e.g. the base station 116 shown in FIG. 1), that is, for example, at least part of the volume is located directly between the first communication device and the destination node. In some examples, the principle is to select, as a next hop for the data packet, a moveable communication device that is closer to a straight line between the first communication device and the destination node than other moveable communication devices. In some examples, the principle is to select a moveable communication device for next hop that is more suitable than other moveable communication devices. For example, by selecting a device that is within the volume, the next hop may be physically closer to the destination than devices outside of the volume. As a result, the complete path from the first communications device to the destination may be shorter and/or include fewer hops than if devices outside of the volume are included. In some examples, other factors may also be considered. Other factors include, for example, velocities of moveable communication devices and/or link quality between the first communication device and moveable communication devices.

Figure 3:
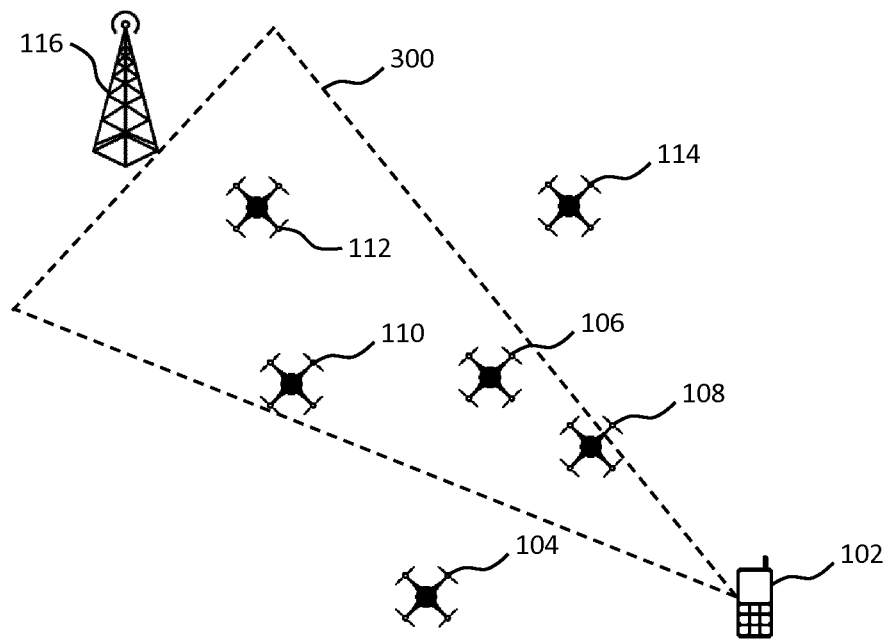
FIG. 3 shows the communication system 100 of FIG. 1 where an example volume has been determined.

The volume may be any suitable shape, which can be defined by device 102. FIG. 3 shows the communication system 100 of FIG. 1, where an example volume 300 has been determined. In this example the volume 300, which is shown in plan view, comprises a conical shape with the first communication device 102 at the apex and the destination node 116 substantially at the centre of the base. Alternatively, the volume 300 may have a triangular cross-section.

The method 200 also comprises, in step 204, determining at least one moveable communication device located within the volume. It can be seen in the example shown in FIG. 3 that the moveable communication devices 106, 108, 110 and 112 are within the volume 300. In some examples, the first node carrying out the method may receive information indicating the locations of moveable communication devices 104-114 (e.g. sent by the respective moveable communication devices themselves), and may also in some examples receive information indicating their velocities. This information may be used for example by the first node to determine whether each moveable communication device is within the volume, and also in some examples to determine whether each moveable communication device will remain within the volume for a predetermined time period, for example by predicting movement at the respective velocity. In some examples, the first node only considers moveable communication devices that are within range of the first communication device. In the example shown in FIG. 3, for example, only the moveable communication devices 104, 106 and 108 that are within range of the first communication device 102 are considered at this stage, and hence step 204 of the method 200 may determine that devices 106 and 108 are within the volume 300.

Step 206 of the method 200 comprises selecting one of the at least one moveable communication device as a next hop for the data packet after the first communication device. For example, as shown in FIG. 3, device 106 or device 108 may be selected. In some examples, other criteria are used to select one of the devices determined in step 204, if there are multiple such devices. For example, the link quality between devices 102 and 106 may be higher than between devices 102 and 104. Alternatively, for example, the velocity of device 108 may be such that it may not remain within the volume 300 for a predetermined time period. In these examples, device 106 may be selected as the next hop for the data packet after the first communication device 102, even if device 108 is physically closer to device 102. The next hop for the data packet after the first communication device as described herein comprises for example the communication device that receives the data packet from the first communication device, and forwards the data packet to a further next hop (which in some cases may be the destination node).

Once the next hop device has been selected, in some examples, the first communication device 102 may forward the data packet to the selected device, e.g. wirelessly, using any suitable protocol or technology, such as e.g. Wi-Fi or cellular/mobile communication. In some examples, the selected next hop device (e.g. the device 106 in the above-described example) may also perform the method 200 to determine the next hop that follows that device. In some examples, each device may store the next hop information in a routing table for the destination (which in some examples comprises a node that is not the ultimate destination for the data packet, and may comprise for example a base station 116).

In some examples of the method 200, selecting one of the at least one moveable communication device as a next hop for the data packet comprises selecting one of the at least one moveable communication device that will be located within the volume for a predetermined time period. This selection may be based in some examples on a respective location and velocity (including speed and direction of movement) of the moveable communication device. Therefore, for example, if a moveable communication device is not predicted to stay within the volume for the predetermined time period, a different device may be selected as the next hop, if available.

In some examples, the method 200 may comprise determining that the selected moveable communication device will not be within the volume for the predetermined time period, e.g. based on a current location and current velocity of the selected moveable communication device, for example by predicting the location of the selected moveable communication device based on available data (location and velocity). In such examples, the method may comprise causing the selected moveable communication device to modify its velocity such that the selected moveable communication device will be located within the volume for the predetermined time period. Thus, for example, the speed and/or direction of the moveable communication device may be modified to allow the device to be used for communication with the first communication device for the predetermined time period. For example, a command, message or instruction may be sent (e.g. from the first node or the first communication device) to the selected device to modify its velocity. In such examples, the selected device may be configured to follow the command and modify its velocity where possible.

In the above described example, the volume is triangular (e.g. wedge-shaped), has a triangular cross-section, or is conical. However, other shapes for the volume may be used in other examples. Possible examples properties for the volume include, but are not limited to, a volume suitable for wireless transmission of the data packet from the first communication device; a contiguous volume; and a volume located at least partially along a straight line between the first node and the destination node.

In some examples of the method 100, determining at least one moveable communication device located within the volume comprises determining neighbour nodes of the node, referred to as the first node. This may comprise for example broadcasting a discovery signal, and receiving a respective response from each of the at least one moveable communication device. In this way, for example, only those moveable communication devices that are within range of the first communication device may be considered when determining which device to select as the next hop after the first communication device. In some examples, the respective response from each of the at least one moveable communication device indicates a respective location and velocity of the at least one moveable communication device. Thus, for example, this information can also be used when selecting the next hop.

In some examples, the next hop after multiple communication devices (e.g. the first communication device and one or more moveable communication devices) along a path from the first communication device to the destination node may be determined in a centralized manner, e.g. by a single node, such as the first node. In some examples, therefore, the method 200 comprises determining a further volume that is at least partially located between the selected moveable communication device (i.e. the next hop after the first communication device) and the destination node, determining at least one further moveable communication device located within the further volume, and selecting one of the at least one further moveable communication device as a further next hop for the data packet after the selected moveable communication device. For example, referring to FIG. 3, a volume that is determined based on moveable communication device 106 may include device 112, which may be selected to be the next hop following device 106. In a centralized embodiment, this device 112 may be selected by the single node and the information forwarded to the device 112, e.g. along with the data packet. In other, non-centralized embodiments, the device 112 may be selected by the previous hop, i.e. device 106. In other words, for example, in a centralized embodiment, multiple hops or all hops along a path between the first communications device and the destination node may be selected by the first node, whereas in non-centralized embodiments (e.g. distributed embodiments) each node along the path may select only its respective next hop.

In some examples, selecting one of the at least one moveable communication device as a next hop for the data packet after the first communication device comprises sending a request to the at least one moveable communication device, receiving a response (e.g. a positive response) from a first set of the at least one moveable communication device, and selecting one of the first set of the at least one moveable communication device as the next hop for the data packet after the first communication device. For example, the request may be a request to each moveable communication device determined to be within the volume to to determine whether each device is able to assume the role of the next hop for the data packet. In some examples, one or more of the moveable communication devices may be unable to be the next hop. In such cases, these device(s) may not return a positive response, and hence would not be in the first set from which the next op is selected. In some examples, these device(s) would return a negative response, and hence would not be selected to be in the first set (based on the negative response). In some examples, the request may identify at least one resource requirement for the at least one moveable communication device, for example a bandwidth requirement of one or more data packets sent or forwarded from the first communication device. The at least one moveable communication device may then use the resource requirement to determine whether it is able to meet the resource requirement, and send a positive response if so.

Figure 4:
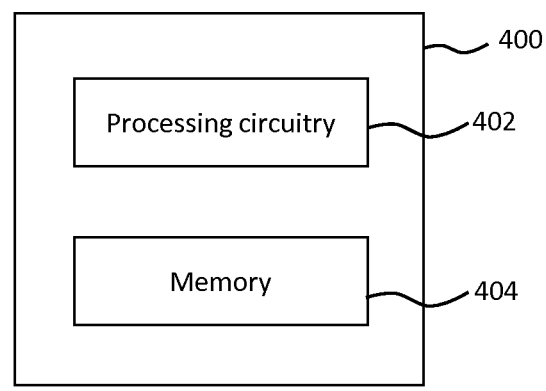
FIG. 4 is an example of apparatus for selecting a next hop for a packet.

FIG. 4 is an example of apparatus 400 capable of selecting a next hop for a packet. The apparatus 400 comprises a processor 402 and a memory 404 in communication with the processor 402. The memory 404 contains instructions executable by the processor 402.

In one embodiment, the memory 404 contains instructions executable by the processing circuitry 402 such that the apparatus 400 is operable to determine a volume that is at least partially located between a first communication device and a destination node of the data packet, determine at least one moveable communication device located within the volume, and select one of the at least one moveable communication device as a next hop for the data packet after the first communication device. In some examples, the memory 404 contains instructions executable by the processing circuitry 402 such that the apparatus 400 is operable to carry out any of the steps of a method of selecting a next hop for a data packet as disclosed herein. In some examples, the apparatus 400 comprises the first communication device or a moveable communication device, depending on which hop the apparatus comprises in a path or sequence of hops from an originating device to the destination.

Particular example embodiments will now be described. In some examples, it is assumed that the destination of a packet (e.g. within a communication system such as communication system 100 shown in FIG. 1) is known and determined by the position of the last visited base station of the originating node, such as a UE, of a packet. Alternatively, the destination may be a default base station, such as a base station that is a default for the originating node or for a location of the originating node.

Since the originating node, which will be referred to in this example as a UE (though other types of originating nodes are possible), knows the last visited base station and its position, it can define a volume that may be optimal for data transmission from the UE to the destination, e.g. the volume is generally located along a line of sight or straight line from the UE to the base station. Based on information in the predictive routing table the UE can select candidate nodes (moveable communication devices) that are located within the defined volume. Referring to the example shown in FIG. 3:

The device 104 is probably not a next hop candidate for a data packet after the first communication device 102 if it is outside of the volume 300 and found to be moving away from the volume.

The UE may predict that the device 108 is moving away from the volume and in the wrong direction (out of the volume). Therefore, this device 108 is not a next hop candidate, unless it is determined that the device 108 can be instructed to slow down or stop, and/or modify its direction, in order to remain within the volume for a predetermined time. However, in the present scenario, there is at least one other suitable device (device 106) and hence the device 108 may not be a next hop candidate based on its current, unmodified velocity.

Device 106 is a potential next hop candidate since it is found to be within the volume 300, to provide a good communication link with the UE 102 and to have a sufficiently low speed, so the UE may estimate that device 106 may remain in the volume for at least a predetermined time. The UE thus selects the device 106 as the next hop.

The device 106 may in turn receive the base station position (e.g. from the UE or another source) and volume data from the UE. The device 106 may in turn use the volume data and the base station position and determine its own potential next hops. In this example, device 106 may have two potential next hops: devices 110 and 112.

Device 112 is considered to be too far away from device 106, and may provide no connection or a poor connection with device 106, and device 110 is found to be moving away from the volume and may not remain within the volume for a predetermined time period. In this example, the volume 300 is the same for devices 102 and 106, though in other examples including other examples of any method disclose herein the device 106 (or any moveable communication device that receives the data packet) may not receive volume data and instead determine its own volume based on its position and the position of the destination (e.g. the base station 116).

Device 106 may send a request (including a request to adapt its velocity, speed and/or location) to device 110, in an attempt to cause it to remain in the volume for at least the predetermined time, or at least for a longer period of time.

The device 110 may autonomously adapt its velocity vector (e.g. remain at current speed and/or position, slow down, adapt route etc), update its routing table and responds ACK to device 106.

Some embodiments as disclosed herein enable a way to extend coverage for a UE (or generally, a first communications device) by predictive routing of packets when a UE is out of coverage or is experiencing poor or unreliable coverage. This may be done in an adhoc manner connecting to multiple moving nodes (e.g. UAVs acting as relaying or routing nodes). The nodes may be moveable communication devices. Some embodiments may trigger a moveable communications device to be requested by another node such as its adjacent node to adapt its velocity and/or position in order to ensure optimal routing for a data packet sent by a first communications device.

A fundamental concept of embodiments of this disclosure is a routing algorithm which allows each moveable communications device to forward packets to one or more of its neighboring moveable communications devices that are within a particular volume, while in some embodiments minimizing the total latency to the data packet's destination (e.g. a base station). Each node/router/device may set up its own predictive routing table. The predictive routing table in some examples consists of potential moveable communication devices (each of which may be the next hop) with their link quality, link latency, speed, position and predicted position (based on the position and velocity), which can be used to calculate estimated time in the volume. Also, embodiments may also comprise a request for adjustments of the next hop in terms of velocity (speed and/or position) to e.g. optimize data transmission from UE to destination.

In some examples, the volume is a predetermined space (e.g. air volume) comprising the optimal positions of moveable communications devices to form a path from the originating device to the destination, e.g. base station. In many cases, the optimal path may be a straight line from the originating device to the destination (particularly where there is line of sight), but there may also be other paths.

Each device, e.g. moveable communications device/first communications device, may in some examples maintain a predictive routing table that indicates the reported (individual/direct) link characteristics as well as UAV positions of the neighboring nodes. This is the basis for finding a good route from the source to the target destination. Each device may distribute information, for example to its neighbor nodes/devices, about its direction, speed (e.g. a velocity vector can give direction and speed) and present location. When the table also contains the velocity (speed/direction) of movement, predicted positions x time units into the future can be determined. As the link characteristics of device to device communication may depend on the distance between them (e.g. when line of sight), the link characteristics or quality between them can similarly be predicted, at a "current" time, and also in some examples x time units into the future by considering the distance between the predicted positions x time units into the future.

In some embodiments, by predicting positions of the nodes, the link characteristics between the first communication device and a number of moveable communication devices (e.g. candidate next hops) after a number of different time periods $t_1, t_2, \ldots, t_k$, and also the predicted throughput and the predicted amount of data that can be delivered over the link over the time period, may be obtained and used in the predicted routing table under time periods $t_1, t_2, \ldots, t_k$. For example, the present location of a candidate next hop at time $t_x$ is used as a starting point to obtain a predicted location at e.g. time $t_{x+5}$ by using the velocity vector. The predicted location can also be used to determine if the candidate next hop will still be in the volume after this time period.

To enable efficient control of the node positions, links that are deteriorating over time according to the predicted positions (e.g. moving away from the first communication device) can be identified and the node(s) can be ordered to stop or modify their movement in order to avoid the links deteriorating or deteriorating too much. Likewise, optimal positions of the nodes in the routing table can be obtained by finding positions which would minimize the total distance/maximize throughput or the individual node-to-node distances/throughput. The predicted routing table may in some examples, in addition to predicted positions and predicted link characteristics, also include node operational parameters (e.g. battery status, etc) which may impact node availability and ability to change its velocity. These parameters may be used to select a next hope node from the candidates, e.g. a node with low battery life may be moving towards a charging point or "home" destination and may not be suitable for a next hop node as it may be leaving the volume soon or may not be able to change its velocity.

Figure 5:
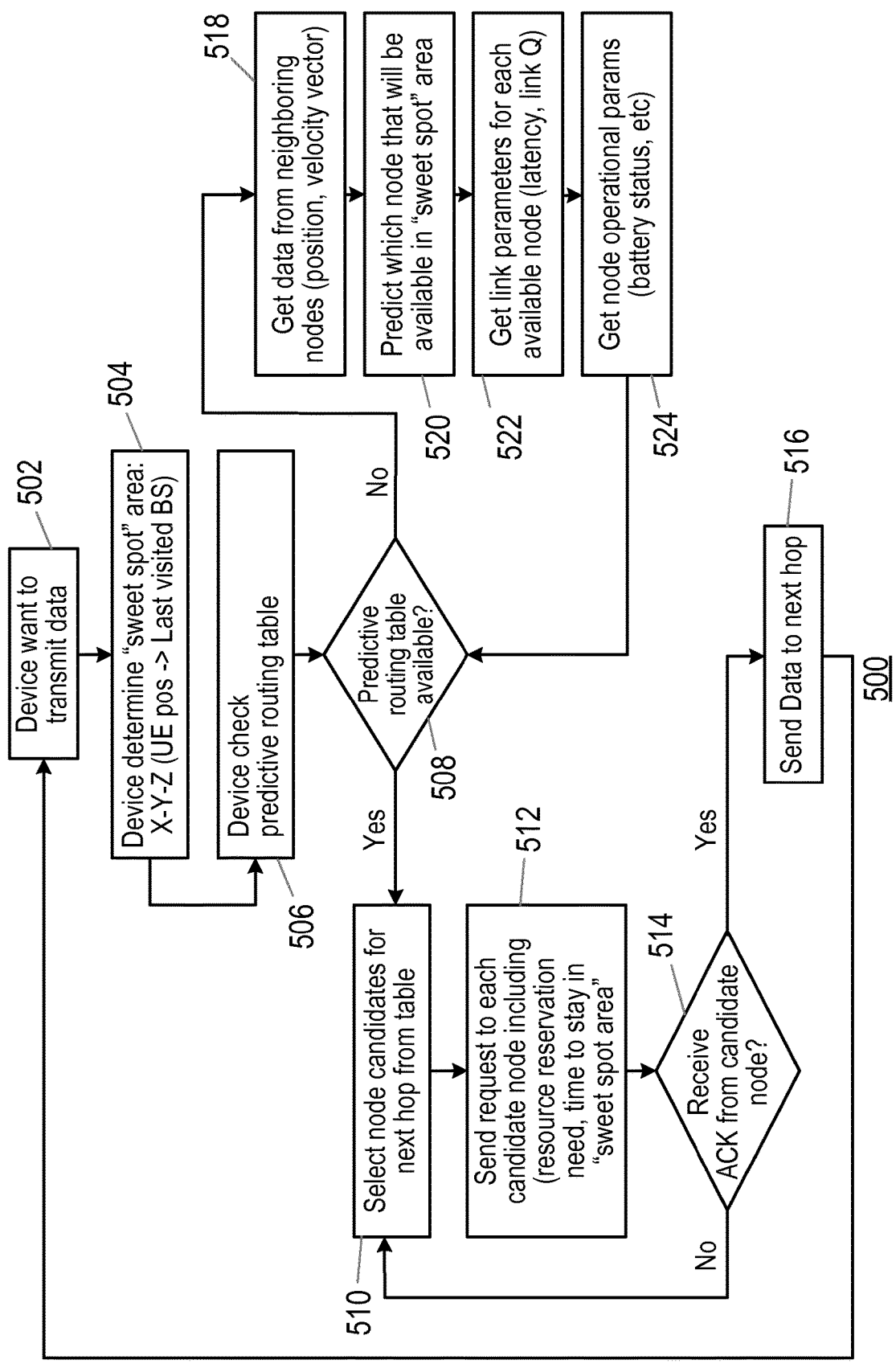
FIG. 5 is a flow chart of an example of a method of determining a next hop for a data packet in a distributed manner.

In some embodiments, next hops from each node may be determined in a distributed manner, e.g. by each node that is to forward a data packet to its respective next hop. The routing at each hop may be determined by a predictive routing table. A flow chart of an example of a method 500 of determining a next hop for a data packet in a distributed manner is shown in FIG. 5. In FIG. 5, the volume mentioned above is referred to as a "sweet spot area". Each node may carry out the method 500.

The method 500 may initially be carried out for example by a UE that want to transmit data (e.g. one or more data packets) and has no or very limited network access directly to a base station. The UE knows its position (using e.g. GPS) and knows the position of the destination, e.g. the last visited base station. The volume determined as described above may be used to determine next hop candidates that are in or close to the optimal signaling path. The method 500 may be repeated for each moveable communications device that becomes part of a path between the first communication device or originating device and the destination node.

The method 500 starts at step 502, where a device (e.g. first communication device) wishes to transmit data, such as one or more data packets. Next, in step 504, the device determines the volume or sweet spot area. Then in step 506 the device checks its predictive routing table. In step 508, the device determines whether the predictive routing table is available. If it is available, in step 510 the device selects the next hop candidates from the table, and in step 512 sends a request to each of the next hop candidate nodes including, for example, the resource reservation (e.g. bandwidth) required to transmit the data to the next hop, and the time that the next hop should stay within the sweet spot area. In step 514, it is determined whether the device has received an acknowledgement ACK or positive response from a candidate next hop node. If not, the method 500 returns to step 510, whereas if an ACK has been received the method 500 proceeds to step 516, where the data is sent to the selected next hop (i.e. the node from which the ACK was received). The method 500 may then return to step 502 when the device wishes to transmit more data.

If in step 508 it is determined that the predictive routing table is not available, the method 500 proceeds to step 518 where the device obtains data pertaining to its neighbor nodes, e.g. their respective positions and velocities. Next, in step 520, the device predicts (e.g. based on position and velocity data) which nodes will remain within the sweet spot area, e.g. for at least a predetermined time period. In step 522, the device obtains link parameters such as latency and/or quality for the nodes identified in step 520 that will remain in the sweet spot area for at least the predetermined time period. Then, in step 524, operational parameters such as node battery status may be obtained from the identified nodes. The predictive routing table may be populated with the above data for the nodes identified in step 520. The method 500 then returns to step 508, and subsequently to step 510.

The device that wishes to transmit or forward a data packet may transmit a request to one or more moveable communication devices (e.g. candidate next hop nodes). When the device receives an acknowledgement (ACK), e.g. a positive response, from one of the candidate nodes, it may start to transmit data packet(s) to said node. The next hop node may in some examples, then start the same procedure for next hop. Information sent to a candidate node may trigger the node to adapt its operation to ensure optimal signaling path by one of the following:

Candidate node may send ACK and adapt its path
Candidate node may send ACK and hold its position
Candidate node may send ACK and reduce its speed
Candidate node may send ACK and increase its speed
Candidate node may send negative response (e.g. negative acknowledgement, NAK) if it will not be able to fulfil request
Candidate node may send NAK due to operational limitations (battery status)
Candidate node may send NAK due to conflict with the candidate node's primary task (e.g. inspection, packet delivery)

Figure 6:
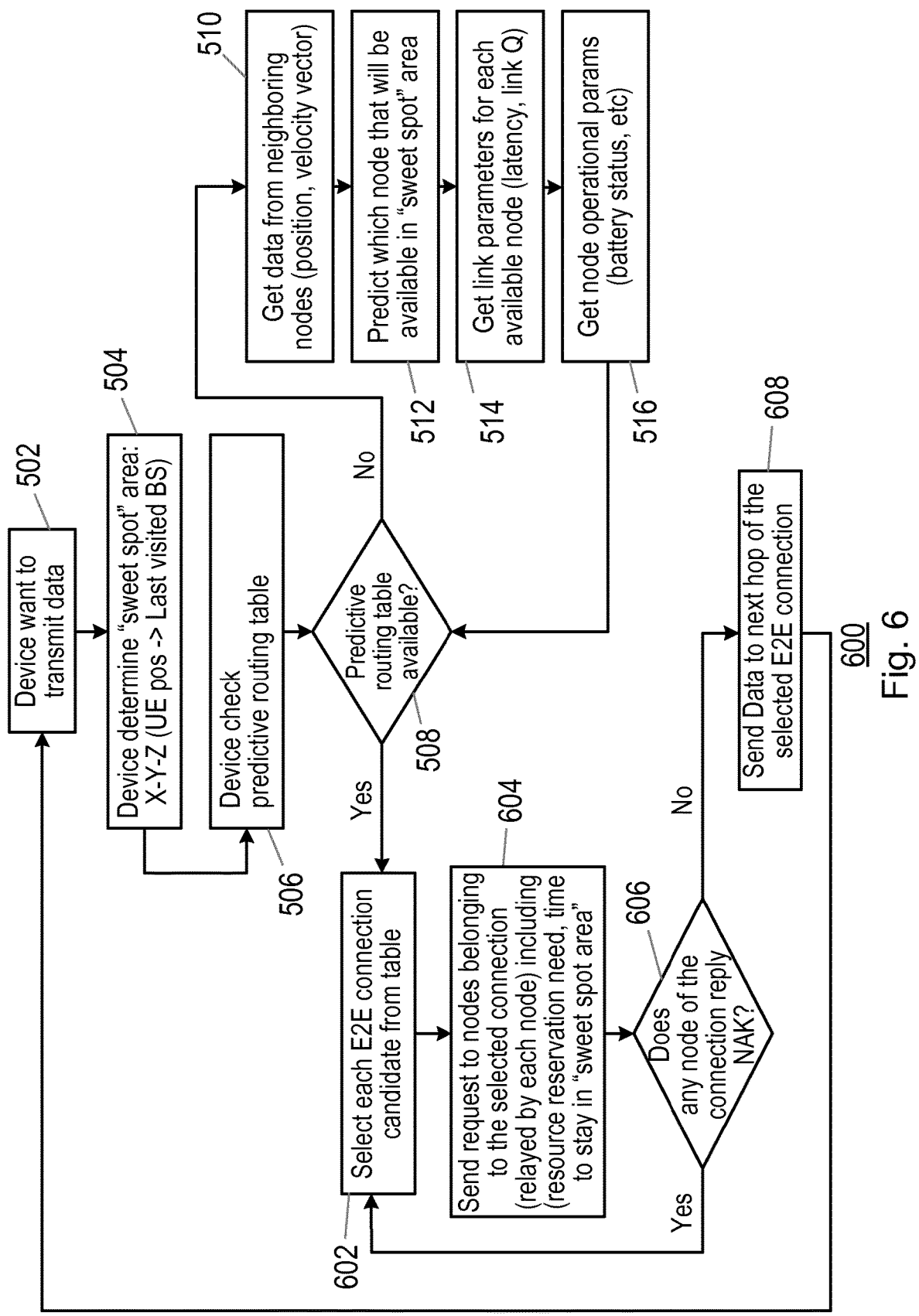
FIG. 6 is a flow chart of an example of a method of determining a next hop for a data packet in a centralized manner.

In some examples, next hop nodes may be determined in a centralized manner. A flow chart of an example of a method 600 of determining a next hop for a data packet in a centralized manner is shown in FIG. 6. In this example, the predictive routing table is jointly created by a single node or group of nodes so that a complete path formed by those nodes may in some examples be established before the data transfer is initiated by the transmitting node.

The method 600 includes steps 502-516 that are similar or identical to steps 502-516 of the method 500 described above with reference to FIG. 5, and may in some examples be carried out by the device that in step 502 wishes to transmit data, though in other examples the method 600 may be carried out by a node other than the device. In the method 600, if in step 508 it is predicted that the predictive routing table is available, the method 600 proceeds to step 602. In step 602, each end-to-end (E2E) connection candidate is selected from the table. That is, for example, each node that could form a hop in a path from the originating device to the destination is selected. Next, in step 604, a request is sent to each of these nodes, in a manner similar to step 512 of FIG. 5, that is, the request indicates, for example, the resource reservation (e.g. bandwidth) required to transmit the data, and the time that the node should stay within the sweet spot area. The request to each node may be relayed by earlier nodes in the path. Then, in step 606, it is determined whether a negative acknowledgement (NAK) is received from any of the selected nodes of the connection (the path between the originating device and the destination). If so, the method returns to step 602. (In some examples, the node that returned a NAK may be excluded from the repeated steps 602-604.) The method then proceeds to step 608, where data indicating the nodes selected as hops for the connection, including which hop is the next hop after each node, is sent to each of the nodes. The method 600 may then return to step 502 when a device wishes to transmit more data.

For example, when there is need for a node/device to initiate data transfer to a specific destination, such as a base station, the transmitting node/device may determine if there is a predictive routing table available to reach the destination. If there is no such table available, the transmitting device may collect data from neighboring nodes to generate a predictive routing table. Subsequently, by looking up the destination of a data packet in the table, the transmitting device can find a connection leading to the destination.

The transmitting device may send a request conveying information such as required resource need, time allocation in the volume, etc to each node in the connection. Upon reception of the request, each intermediate node along the connection may confirm if the request is accepted or rejected. More than one candidate connection and candidate node in the connection may be selected. The transmitting device may select an appropriate (e.g. optimum) connection based on the response messages received from nodes. The distributed method may be carried out by the originating device (e.g. first communications device) or any other node.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a first node of selecting a next hop for a data packet, the method comprising:
   determining a volume that is at least partially located between a first communication device and a destination node of the data packet;
   determining at least one moveable communication device located within the volume; and
   selecting one of the at least one moveable communication device as a next hop for the data packet after the first communication device based on the one of the at least one moveable communication device being located within the volume for a predetermined time period.

2. A non-transitory computer readable storage media having stored thereon a computer program comprising instructions which, when executed on at least one processor, cause the at least one processor to:
   determine a volume that is at least partially located between a first communication device and a destination node of a data packet;
   determine at least one moveable communication device located within the volume; and
   select one of the at least one moveable communication device as a next hop for the data packet after the first communication device based on the one of the at least one moveable communication device being located within the volume for a predetermined time period.

3. An apparatus for selecting a next hop for a data packet, the apparatus comprising a processor and a memory, the memory containing instructions executable by the processor such that the apparatus is configured to:
   determine a volume that is at least partially located between a first communication device and a destination node of the data packet;
   determine at least one moveable communication device located within the volume; and
   select one of the at least one moveable communication device as a next hop for the data packet after the first communication device based on the one of the at least one moveable communication device being located within the volume for a predetermined time period.

4. The apparatus of claim 3, wherein the memory contains instructions executable by the processor such that the apparatus is configured to determine whether each of the at least one moveable communication device will be located within the volume for the predetermined time period based on a respective location and velocity.

5. The apparatus of claim 3, wherein the memory contains instructions executable by the processor such that the apparatus is configured to determine that the selected moveable communication device will not be within the volume for the predetermined time period based on a current location and current velocity of the selected moveable communication device, and cause the selected moveable communication device to modify its velocity such that the selected moveable communication device will be located within the volume for the predetermined time period.

6. The apparatus of claim 5, wherein the memory contains instructions executable by the processor such that the apparatus is configured to cause the selected moveable communication device to modify its velocity by sending a command to the selected moveable communication device.

7. The apparatus of claim 3, wherein each of the at least one moveable communication device is mounted on an Unmanned Aerial Vehicle (UAV).

8. The apparatus of claim 3, wherein at least one of the following applies:
   the volume comprises a volume suitable for wireless transmission of the data packet from the first communication device;
   the volume comprises a contiguous volume;
   the volume is located at least partially along a straight line between a first node and the destination node, the first node being the apparatus;
   the volume is within a predetermined distance or predetermined horizontal distance of the straight line; and
   the volume comprises a substantially triangular or conical volume whereby the destination node is located substantially in a centre of the base of the volume.

9. The apparatus of claim 3, wherein the memory contains instructions executable by the processor such that the apparatus is configured to select one of the at least one moveable communication device based at least in part on communication quality to each of the at least one moveable communication device.

10. The apparatus of claim 3, wherein the destination node of the data packet comprises a base station.

11. The apparatus of claim 3, wherein each of the at least one moveable communication device comprises a device suitable for receiving and forwarding the data packet.

12. The apparatus of claim 3, wherein a first node comprises a moveable communication device or a User Equipment (UE), the first node being the apparatus.

13. The apparatus of claim 12, wherein the memory contains instructions executable by the processor such that the apparatus is configured to transmit the data packet wirelessly to the selected moveable communication device.

14. The apparatus of claim 12, wherein the memory contains instructions executable by the processor such that the apparatus is configured to determine at least one moveable communication device located within the volume by determining neighbour nodes of the first node.

15. The apparatus of claim 14, wherein the memory contains instructions executable by the processor such that the apparatus is configured to determine neighbour nodes of the first node by broadcasting a discovery signal, and receiving a respective response from each of the at least one moveable communication device.

16. The apparatus of claim 15, wherein the respective response from each of the at least one moveable communication device indicates a respective location and velocity of the at least one moveable communication device.

17. The apparatus of claim 3, wherein the memory contains instructions executable by the processor such that the apparatus is configured to:
   determine a further volume that is at least partially located between the selected moveable communication device and the destination node;
   determine at least one further moveable communication device located within the further volume; and
   select one of the at least one further moveable communication device as a further next hop for the data packet after the selected moveable communication device.

18. The apparatus of claim 3, wherein the memory contains instructions executable by the processor such that the apparatus is configured to select one of the at least one moveable communication device as a next hop for the data packet after the first communication device by:
   sending a request to the at least one moveable communication device;
   receiving a response from a first set of the at least one moveable communication device; and
   selecting one of the first set of the at least one moveable communication device as the next hop for the data packet after the first communication device.

* * * * *